United States Patent [19]

Henry et al.

[11] 4,449,197

[45] May 15, 1984

[54] ONE-BIT FULL ADDER CIRCUIT

[75] Inventors: James L. Henry, Allentown; Wendy A. Stocker, Center Valley, both of Pa.

[73] Assignee: Bell Telephone Laboratories, Incorporated, Murray Hill, N.J.

[21] Appl. No.: 356,765

[22] Filed: Mar. 10, 1982

[51] Int. Cl.³ ............................................. G06F 7/50
[52] U.S. Cl. ..................................... 364/784; 364/786
[58] Field of Search ...................... 364/784, 785, 786

[56] References Cited

U.S. PATENT DOCUMENTS

| | | | |
|---|---|---|---|
| 3,407,357 | 10/1968 | Spandorfer et al. | 364/784 |
| 3,454,751 | 7/1969 | Brastins et al. | 364/784 |
| 3,465,133 | 9/1969 | Booher | 364/786 |
| 3,978,329 | 8/1976 | Baugh et al. | 364/785 |
| 4,071,905 | 1/1978 | Oguchi et al. | 364/784 |
| 4,229,803 | 10/1980 | Rhodes | 364/787 |

OTHER PUBLICATIONS

Taub, *Digital Integrated Electronics* McGraw-Hill, Inc. 1977, pp. 164-169.
*The TTL Data book for Design Engineers* Second Edition, Texas Instruments, Inc., Oct. 1976, pp. 7-54.

*Primary Examiner*—David H. Malzahn
*Attorney, Agent, or Firm*—Arthur J. Torsiglieri

[57] ABSTRACT

The present invention is a one-bit full adder circuit having a fast carry. The circuit may be implemented using integrated injection logic in which case the circuit comprises six NAND gates and two wired AND gates. Advantageously, there is only a single gate delay in the carry path.

2 Claims, 3 Drawing Figures

ONE-BIT FULL ADDER CIRCUIT

TECHNICAL FIELD

The present invention relates to an electronic circuit for performing arithmetic and more particularly to a one-bit full adder circuit having a fast carry.

BACKGROUND OF THE INVENTION

Typically, a one-bit full adder circuit produces sum and carry output signals in response to two operand input signals and their complements, and a carry input signal and its complement.

Table 1, shown below, is a truth table for a typical one-bit full adder. In table 1 the operand input signals are designated X and Y, and the complements of the operand input signals are designated $\overline{X}$ and $\overline{Y}$, respectively. The carry input signal is designated $Z_{in}$, and the complement of the carry input signal is designated $\overline{Z}_{in}$. Similarly, the sum output signal is designated S and its complement is designated $\overline{S}$, and the carry output signal is designated $Z_{out}$ and its complement is designated $\overline{Z}_{out}$.

TABLE 1

| Inputs | | | | | | Outputs | | | |
|---|---|---|---|---|---|---|---|---|---|
| X | Y | $\overline{X}$ | $\overline{Y}$ | $Z_{in}$ | $\overline{Z}_{in}$ | S | $\overline{S}$ | $Z_{out}$ | $\overline{Z}_{out}$ |
| 0 | 0 | 1 | 1 | 0 | 1 | 0 | 1 | 0 | 1 |
| 0 | 1 | 1 | 0 | 0 | 1 | 1 | 0 | 0 | 1 |
| 1 | 0 | 0 | 1 | 0 | 1 | 1 | 0 | 0 | 1 |
| 1 | 1 | 0 | 0 | 0 | 1 | 0 | 1 | 1 | 0 |
| 0 | 0 | 1 | 1 | 1 | 0 | 1 | 0 | 0 | 1 |
| 0 | 1 | 1 | 0 | 1 | 0 | 0 | 1 | 1 | 0 |
| 1 | 0 | 0 | 1 | 1 | 0 | 0 | 1 | 1 | 0 |
| 1 | 1 | 0 | 0 | 1 | 0 | 1 | 0 | 1 | 0 |

When arithmetic operations on multidigit numbers are to be performed substantially simultaneously for all orders, a number of one-bit full adder circuits, equal to the number of digits, are connected in parallel. In this case, the carry output signal and/or its complement depending on the particular circuit arrangement, from a one-bit full adder circuit operably connected to add two same order digits becomes the carry input signal to the adjacent one-bit full adder circuit which is operably connected to add the two next higher order digits. (See H. Taub et al, "Digital Integrated Electrons", McGraw-Hill, Inc., 1977, pp. 362-363.) Consequently, the carry output signal at the most signficant bit is delayed by the propagation delay time of the carry signal through each one-bit full adder multiplied by the number of one-bit full adders. As a result of this, the time required for arithmetic operations is prolonged.

The propagation delay time of the carry signal is the time interval between the entry of a valid carry input signal into the one-bit full adder and the emergence of a valid carry output signal from the one-bit full adder. This time is dependent upon the number of transistor gates in the carry path between the carry input and the carry output. Accordingly, efforts have been directed to the development of one-bit full adder circuits comprising a minimum number of transistor gates and especially a minimum number of transistor gates in the carry path to reduce the carry delay.

SUMMARY OF THE INVENTION

The present invention is a one-bit full adder having a fast carry. In particular, this is achieved by an adder comprising basically six NAND gates and two AND gates appropriately interconnected. However, when implemented in integrated injection logic, each of the AND gates can be a wired AND gate, not requiring a separate component, whereby only six gates involving transistors are required. This is highly advantageous when the inventive one-bit full adder is included as part of a large integrated circuit because chip "real estate" is almost always a scarce commodity.

In accordance with the principles of the present invention, a one-bit full adder advantageously comprises: a first NAND gate operatively connected for receiving first and second operand input signals and for producing a first output signal; a second NAND gate operative connected for receiving the complements of the first and second operand input signals and for producing a second output signal; a third NAND gate operatively connected for receiving the first and second output signals and for producing a third output signal; a fourth NAND gate operatively connected for receiving a carry input signal and the first and second output signals and for producing a fourth output signal; a fifth NAND gate operatively connected for receiving the complement of the carry input signal and the third output signal and for producing a fifth output signal; a sixth NAND gate operatively connected for receiving the first and fourth output signals and for producing a carry output signal; a first AND gate operatively connected for receiving the first and fourth output signals and for producing the complement of the carry output signal; and a second AND gate operatively connected for receiving the fourth and fifth output signals and for producing a sum output signal.

Consider the case where the above-mentioned one-bit full adder is operatively connected to add two numbers $A_n$ and $B_n$ which are the $n^{th}$ order digits of two multidigit numbers $A_m \ldots A_n A_{n-1} \ldots A_o$ and $B_m \ldots B_n B_{n-1} \ldots B_o$, respectively. If the first and second operand input signals correspond to the true form of $A_n$ and $B_n$, and the carry input signal corresponds to the true form of the carry, $C_{n-1}$, which results from performing the order n-1 addition, then the sum and carry output signals correspond to the true forms of the sum and carry obtained when adding $A_n$, $B_n$, and $C_{n-1}$. Alternatively, the inventive adder can be operatively connected so that its logic sense inverts. If false forms are made, the first and second operand input signals (i.e., they correspond to $\overline{A}_n$ and $\overline{B}_n$, respectively) and the false form is made the carry input signal (i.e., it corresponds to $\overline{C}_{n-1}$, the false form of the carry which results from performing the order n-1 addition), then the sum and carry output signals will correspond to the false forms of the sum and carry obtained when adding $A_n$, $B_n$, and $C_{n-1}$.

In a particular embodiment of the invention, the one-bit full adder advantageously is implemented using integrated injection logic. (See H. Taub et al, "Digital Integrated Electronics", McGraw-Hill, 1977.) In this case, each of the AND gates is a wired AND gate. Each of the NAND gates comprises: an npn bipolar transistor having a grounded emitter, a base, and at least one collector; and a wired AND gate for receiving a plurality of input signals and for producing a signal in response to the input signals which is transmitted to the base of the npn transistor. Current is injected into the base of the npn transistor from a pnp transistor. The npn transistor serves to invert the signal transmitted to its base from the wired AND gate. Thus, the output signal of the NAND gate appears at the collector of the npn transistor. It should be noted that each npn transistor included in an I²L NAND gate can have more than one collector.

It should also be noted that when implemented using I²L, the inventive one-bit full adder circuits can be connected in parallel so that there is only a single gate delay in the carry path of each stage, thereby significantly reducing the total time for performing arithmetic operations on multidigit numbers. This is accomplished by connecting in parallel each one-bit full adder so that its logic sense is inverted with respect to that of adjacent stages. Each stage, with the exception of the most significant bit (MSB) and the least significant bit (LSB) is exactly like every stage (the MSB stage requires only the true or false form of the carry output signal and not both, and the LSB stage does not receive any carry input signals). This advantageous feature which makes design and layout easier is not found in most full adders having a fast carry.

DETAILED DESCRIPTION

Figure 1:
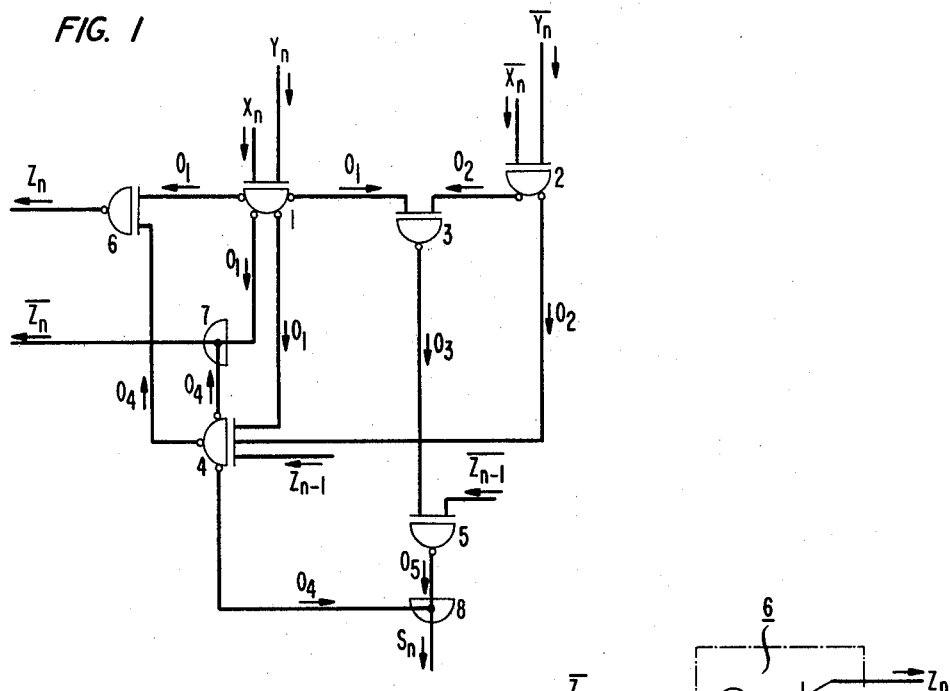
FIG. 1 shows a one-bit full adder circuit in accordance with an illustrative embodiment of the invention.

An illustrative embodiment of the inventive one-bit full adder circuit is shown schematically in FIG. 1. The one-bit full adder of FIG. 1 includes six NAND gates and two wired AND gates. This circuit is designed to process two operand input signals $X_n$ and $Y_n$, their complements $\overline{X}_n$ and $\overline{Y}_n$, a carry input signal $Z_{n-1}$, and its complement $\overline{Z}_{n-1}$, to produce a carry output signal $Z_n$, its complement $\overline{Z}_n$, and a sum output signal $S_n$. The circuit shown in FIG. 1 implements the Boolean function of Table 1.

More particularly, the one-bit full adder circuit of FIG. 1 includes the following gates:

(1) NAND gate 1 which is operably connected for receiving operand input signals $X_n$ and $Y_n$ and for producing signal $O_1$;

(2) NAND gate 2 which is operably connected for receiving signals $\overline{X}_n$ and $\overline{Y}_n$ and for producing signal $O_2$;

(3) NAND gate 3 which is operably connected for receiving carry input signals $O_1$ and $O_2$ and for producing signal $O_3$;

(4) NAND gate 4 which is operably connected for receiving carry input signal $Z_{n-1}$ and signals $O_1$ and $O_2$ and for producing signal $O_4$;

(5) NAND gate 5 which is operably connected for receiving the complement of the carry input signal $\overline{Z}_{n-1}$ and signal $O_3$ and for producing signal $O_5$;

(6) NAND gate 6 which is operatively connected for receiving signals $O_1$ and $O_4$ and for producing the carry output signal $Z_n$;

(7) Wired AND gate 7 which is operatively connected for receiving signals $O_1$ and $O_4$ and for producing signal $\overline{Z}_N$, the complement of carry output signal $Z_n$;

(8) Wired AND gate 8 which is operatively connected for receiving signals $O_4$ and $O_5$ and for producing sum output signal $S_n$.

Figure 2:
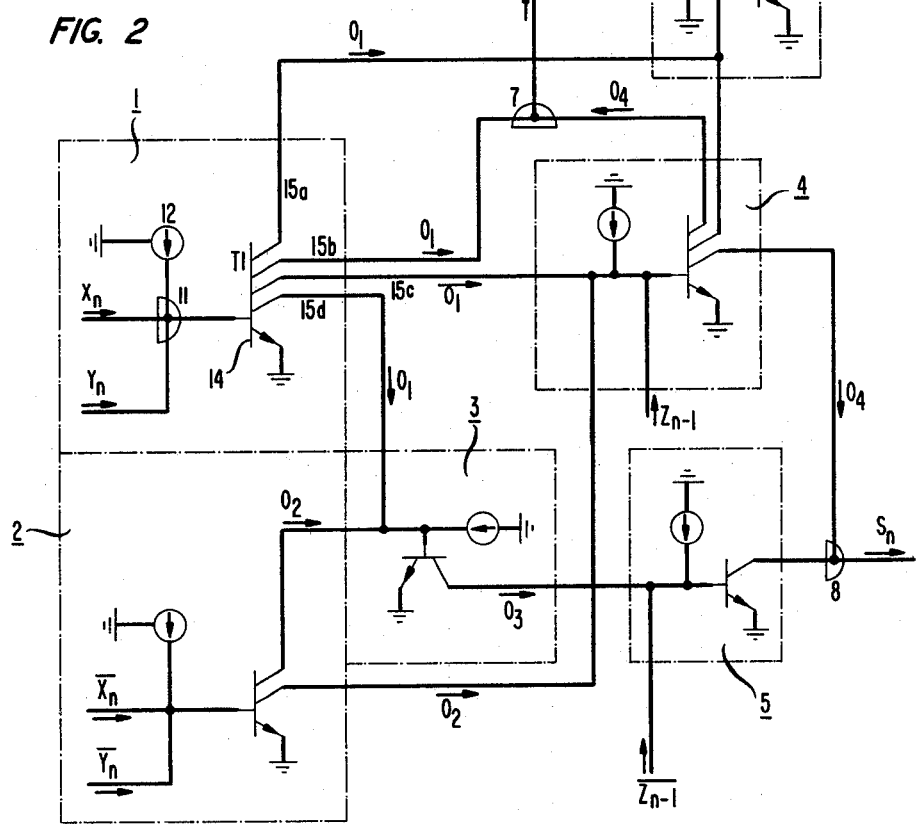
FIG. 2 shows the circuit of FIG. 1 when it is implemented using integrated injection logic.

FIG. 2 shows the circuit of FIG. 1 when it is implemented using I²L logic. NAND gates 1 through 6 of FIG. 1 are shown as circuits 1 through 6 of FIG. 2, respectively. Wired AND gates 7 and 8 of FIG. 2 correspond to wired AND gates 7 and 8 FIG. 1, respectively.

Each NAND gate of FIG. 2 includes a wired AND gate and an npn transistor, which serves as an inverter. Current is selectively injected into the base of the npn transistor from a pnp transistor. Illustratively, NAND gate 1 of FIG. 2 includes wired AND gate 11, current source 12, which illustratively comprises a pnp transistor, and npn transistor $T_1$ which includes grounded emitter 13, base 14, and collectors 15a, 15b, 15c, and 15d. NAND gate 1 of FIG. 2 operates as follows. If $X_n$ and $Y_n$ are both high, $T_1$ is conducting and the signal at the collectors is LOW, otherwise $T_1$ is not conducting and the collectors are HIGH.

Figure 3:
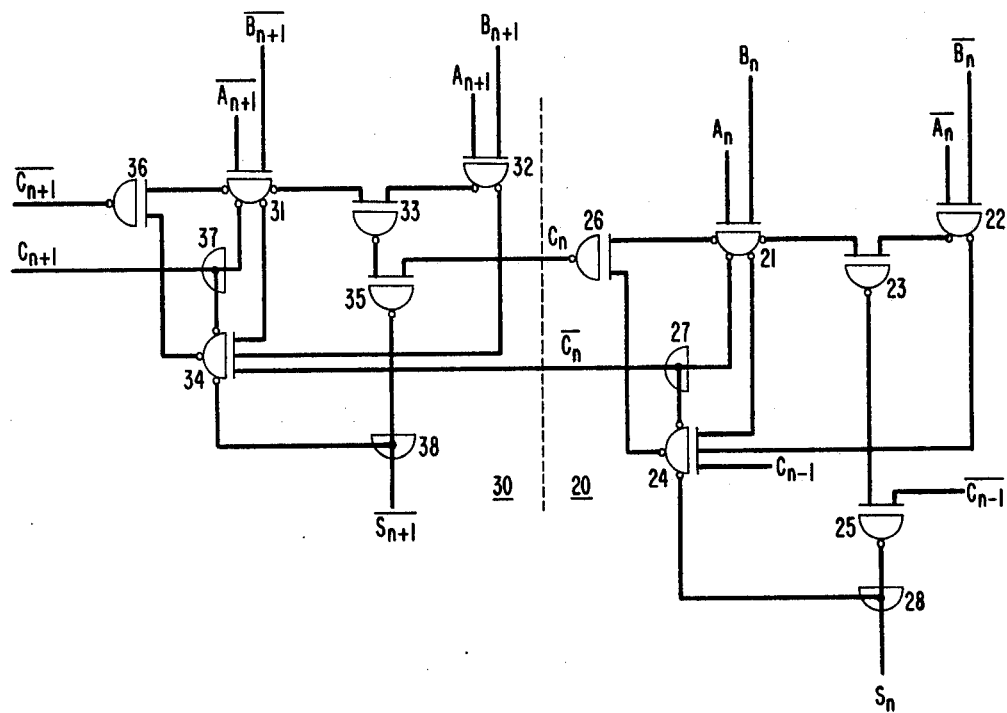
FIG. 3 shows two inventive one-bit full adders connected in parallel.

As previously indicated, a plurality of the above-described one-bit full adders can be connected in parallel in order to perform multidigit arithmetic. FIG. 3 shows two such one-bit full adders 20 and 30 connected in parallel for adding orders n and n+1 of multidigit numbers $A_m \ldots A_{n+1} A_n \ldots A_o$ and $B_m \ldots B_{n+1} B_n \ldots B_o$ in order to produce the n and n+1 orders of the sum $S_m \ldots S_{n+1} S_n \ldots S$. Each of circuits 20 and 30 has a configuration identical to that of the one-bit full adder shown in FIG. 1. In circuit 20, NAND gates 21, 22, 23, 24, 25 and 26 correspond to NAND gates 1, 2, 3, 4, 5, and 6 of FIG. 1, respectively, and wired AND gates 27 and 28 correspond to AND gates 7 and 8 of FIG. 1, respectively. Similarly, in circuit 30, NAND gates 31, 32, 33, 34, 35, and 36 correspond to NAND gates 1, 2, 3, 4, 5, and 6 of FIG. 1, respectively, and wired AND gates 37 and 38 correspond to AND gates 7 and 8 of FIG. 1, respectively. Circuit 20 is operably connected for adding the order n digits of the two multidigit numbers; i.e., $A_n$ and $B_n$, and circuit 30 is connected for adding the order n+1 digits of the two multidigit numbers; i.e., $A_{n+1}$ and $B_{n+1}$.

In circuit 20, the operand input signals to NAND gate 21 correspond to the true forms of $A_n$ and $B_n$, respectively, and the carry input signal $C_{n-1}$ is also in its true form. Note that carry input signals $C_{n-1}$ and $\overline{C}_{n-1}$ correspond to the true and false forms, respectively, of the carry resulting from the order n-1 addition. The output signals from circuit 20 are $S_n$, the true form of the $n^{th}$ order sum, $C_n$, the true form of the $n^{th}$ order carry, and $\overline{C}_n$, the false form of the $n^{th}$ order carry.

Circuit 30 is connected so that its logic sense is inverted with respect to the logic sense of circuit 20. The input signals to NAND gate 31 are $\overline{A}_{n+1}$ and $\overline{B}_{n+1}$. These are the false forms of the digits, $A_{n+1}$ and $B_{n+1}$, whose sum is desired. The true form of the signals $A_{n+1}$ and $B_{n+1}$ is entered into NAND gate 32. Similarly, while in circuit 20 the true form of the carry input signal, $C_{n-1}$, is entered into NAND gate 24 and the false form of the carry input signal, $\overline{C}_{n-1}$, is entered into NAND gate 25, in circuit 30 the false form of the carry input signal, $\overline{C}_n$, is entered into NAND gate 34 and the true form of the carry input signal, $C_n$, is entered into NAND gate 35. Consequently, the sum output signal of circuit 30 which emanates from NAND gate 38 is the false form of the sum $S_{n+1}$ which results from adding $A_{n+1}$, $B_{n+1}$, and $C_n$ and is indicated as $\overline{S}_{n+1}$. Similarly, the carry output signal of circuit 30 which emanates from NAND gate 36 corresponds to the false form of the carry which results from adding $A_{n+1}$, $B_{n+1}$, and $C_n$ and this is designated $\overline{C}_{n+1}$. The signal corresponding to the true form of the carry which results from adding $A_{n+1}$, $B_{n+1}$, and $C_n$ emanates from wired AND gate 37. In contrast, in circuit 20 the signal $S_n$ which emanates from wired AND gate 28 corresponds to the true form of the sum and the signal which emanates from NAND gate 26 corresponds to the true form of the carry.

For most applications of a plurality of one-bit adders connected in parallel the fact that the logic sense of the sum output signal inverts with each successive stage causes no difficulties or requirements for additional circuitry. The reason for this is that the sum output signal (whether in true or false form) is generally entered into a flip-flop (not shown) which produces output signals corresponding to both the true and false forms of the input signal.

Advantageously, when the inventive one-bit full adder circuit is connected in parallel in such a way that the logic sense inverts with each successive stage, there is only a single gate delay in the carry path of each stage. Note in circuit 20 the carry output signals $C_n$ and $\bar{C}_n$ are partially dependent upon the true form of the carry input signal $C_{n-1}$ and are not dependent upon the false form of the carry input signal $\bar{C}_{n-1}$. Similarly, in circuit 30 the carry output signals $C_{n+1}$ and $\bar{C}_{n+1}$ are dependent upon the false form of the carry input signal $\bar{C}_n$ and not upon the true form $C_n$.

It is thus desirable to have circuit 20 produce the signal $\bar{C}_n$ as rapidly as possible after the signal $C_{n-1}$ is available. In circuit 20 there is only a single gate in circuit path through which $C_{n-1}$ is processed to produce $\bar{C}_n$. This path includes NAND gate 24 and wired AND gate 27 and the single gate delay results from the npn transistor in NAND gate 24. Similarly, the important carry output signal of circuit 30 is $C_{n+1}$ because it is this signal which will partially determine the n+2 order carry output signals. Thus, in circuit 30 the carry path over which $\bar{C}_n$ is processed to produce $C_{n+1}$ includes NAND gate 34 and wired AND gate 37. Again there is only a single transistor gate delay in this path resulting from the npn transistor in NAND gate 34. It should be noted that if the above-described successive one-bit full adders are not connected so that the logic sense inverts with each successive stage, there are at least two gate delays in the carry path of each stage.

Finally, it is to be understood that the above-described circuits are only illustrative of the principles of the present invention. In accordance with these principles numerous other structural configurations may be devised by those skilled in the art without departing from the spirit and scope of the invention.

In particular, the one-bit full adder described above can be adapted to operate for subtraction, which is a special form of addition. (See Taub, supra, pp. 369-371.) The basic point to realize in attempting to implement subtraction using the above-described one-bit full adder is that the truth table (see Table 1) for the operation $X+Y+Z_{in}$ where $Z_{in}$ is a carry input signal is the same as the truth table for $\bar{X}-Y-Z_{in}$ where $Z_{in}$ is now a borrow input signal. Thus, depending on how one interprets the operand input signals, the output signals from the inventive circuit can be considered to be sum and carry output signals or difference and borrow output signals.

What is claimed is:

1. A one-bit full adder circuit comprising:
means forming a first NAND gate operatively connected for receiving first and second operand input signals and for producing a first output signal;
means forming a second NAND gate operatively connected for receiving complements of said first and second operand input signals and for producing a second output signal;
means forming a third NAND operatively connected for receiving said first and second output signals and for producing a third output signal;
means forming a fourth NAND gate operatively connected for receiving a carry input signal and said first and second output signals and for producing a fourth output signal;
means forming a fifth NAND gate operatively connected for receiving the complement of said carry input signal and said third output signal and for producing a fifth output signal;
means forming a sixth NAND gate operatively connected for receiving said first and fourth output signals and for producing a carry output signal;
means forming a first AND gate operatively connected for receiving said first and fourth output signals and for producing the complement of said carry output signal; and
means forming a second AND gate operatively connected for receiving said fourth and fifth output signals and for producing a sum output signal.

2. The single-bit full adder circuit of claim 1 wherein:
each of said AND gates is a wired AND gate; and each of said means forming said NAND gates comprises:
an npn bipolar transistor having a grounded emitter, a base, and at least one collector, current being selectively injected into said base from pnp transistor means; and
a wired AND gate for receiving a plurality of input signals and for producing an output signal which is transmitted to said base of said npn transistor.

* * * * *